United States Patent
Mishra et al.

(10) Patent No.: US 11,582,660 B2
(45) Date of Patent: Feb. 14, 2023

(54) METHOD AND BASE STATION FOR HANDOVER MANAGEMENT IN WIRELESS NETWORK

(71) Applicant: Samsung Electronics Co., Ltd., Suwon-si (KR)

(72) Inventors: Vikash Mishra, Bangalore (IN); Namo Narayan Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/326,589

(22) Filed: May 21, 2021

(65) Prior Publication Data

US 2021/0368405 A1 Nov. 25, 2021

(30) Foreign Application Priority Data

May 22, 2020 (IN) .............................. 202041021657
Mar. 12, 2021 (IN) .............................. 202041021657

(51) Int. Cl.
*H04W 36/00* (2009.01)
*H04W 36/08* (2009.01)
*H04W 24/10* (2009.01)
*H04W 36/24* (2009.01)

(52) U.S. Cl.
CPC ....... *H04W 36/0085* (2018.08); *H04W 24/10* (2013.01); *H04W 36/0058* (2018.08); *H04W 36/00835* (2018.08); *H04W 36/08* (2013.01); *H04W 36/245* (2013.01)

(58) Field of Classification Search
CPC ........... H04W 36/00837; H04W 36/08; H04W 36/0058; H04W 36/36; H04W 36/245;
(Continued)

(56) References Cited

U.S. PATENT DOCUMENTS

2010/0254348 A1 10/2010 Prakash et al.
2017/0208524 A1 7/2017 Fukui et al.
(Continued)

FOREIGN PATENT DOCUMENTS

CN 103379574 B 3/2016
JP 2021510272 A 4/2021
(Continued)

OTHER PUBLICATIONS

International Search Report dated Aug. 10, 2021 in connection with International Patent Application No. PCT/KR2021/005544, 4 pages.
(Continued)

*Primary Examiner* — Nam T Huynh

(57) ABSTRACT

Embodiments herein provide a method handover management in a wireless network (1000). Ultra-reliable low latency communication (URLLC) is a key feature in 5G which requires improved mobility performance and reliability. In future, the number of mobility (handover) scenarios is bound to increase many folds, and without proper technologies, the number of mobility may induce more handover failures. For a better quality of experience (QoE) in 5G new radio (NR), it is important to have minimal interruption time and a high handover success rate. The method in the present disclosure provides a novel machine learning (ML) based advance handover (HO). Further, the method provides initiating HO, by a source gNB in advance before a user equipment (UE) runs into radio link failure (RLF) to ensure less handover failure (HOF) rate.

17 Claims, 6 Drawing Sheets

(58) Field of Classification Search
CPC ............. H04W 36/30; H04W 36/0061; H04W 36/0083; H04W 36/00835; H04W 36/0085; H04W 36/0094; H04W 36/24
See application file for complete search history.

(56) References Cited

U.S. PATENT DOCUMENTS

| | | |
|---|---|---|
| 2019/0223073 A1 | 7/2019 | Chen et al. |
| 2019/0380072 A1 | 12/2019 | Sharma et al. |
| 2020/0045602 A1 | 2/2020 | Jiang |
| 2020/0084683 A1 | 3/2020 | Moosavi et al. |

FOREIGN PATENT DOCUMENTS

| | | | | |
|---|---|---|---|---|
| KR | 10-2012-0022855 A | 3/2012 | | |
| WO | WO-2014169880 A1 * | 10/2014 | ........ | H04W 36/0033 |
| WO | 2018188078 A1 | 10/2018 | | |
| WO | 2018197097 A1 | 11/2018 | | |
| WO | WO-2021123285 A1 * | 6/2021 | | |

OTHER PUBLICATIONS

Written Opinion of the International Searching Authority dated Aug. 10, 2021 in connection with International Patent Application No. PCT/KR2021/005544, 4 pages.

Intellectual Property India, "Examination report under sections 12 &13 of the Patents Act" dated Feb. 3, 2022, in connection with Indian Patent Application No. 202041021657, 6 pages.

* cited by examiner

METHOD AND BASE STATION FOR HANDOVER MANAGEMENT IN WIRELESS NETWORK

CROSS REFERENCE TO RELATED APPLICATIONS

This application is based on and claims priority under 35 U.S.C. § 119 to Indian Provisional Patent Application No. 202041021657 filed on May 22, 2020, and Indian Complete Patent Application No. 202041021657 filed on Mar. 12, 2021, the disclosures of which are herein incorporated by reference in their entirety.

BACKGROUND

1. Field

The present disclosure relates to wireless communication, and more specifically related to initiate a handover (HO) procedure in advance before a user equipment (UE) runs into radio link failure (RLF) to ensure less handover failure (HOF) rate.

2. Description of the Related Art

In general, the HO procedure in 5th generation (5G) new radio (NR) is similar to a procedure in long-term evolution (LTE), in which a wireless network controls UE mobility based on a measurement report received from the UE. However, the NR has both a beam level and a cell level mobility, while the LTE has only the cell level mobility. Furthermore, adoption of high-frequency bands with beamforming may increase interruption time in the NR as compared to the LTE due to a beam sweep delay.

Furthermore, the HO procedure is defined in 3GPP TS 38.133 and 38.331 as shown in a FIG. 1. The FIG. 1 is a sequence diagram illustrating various operations for performing the HO procedure. At S102-S104, a UE (10) first sends a measurement report to a source gNB (20) for a HO decision. The measurement report can be periodic or event-triggered based on network infrastructure and RF (radio frequency) environment. Furthermore, during a measurement gap, there is no data transmission/reception between the UE (10) and the source gNB (20). Furthermore, the UE (10) measures a plurality of parameters associated with a plurality of neighbor-cells/target cells (e.g., target gNB (30)) and if the plurality of parameters meets a threshold limit then the UE (10) reports that event through the measurement report to the source gNB (20). At S106, the source gNB (20) determines whether the target gNB (30) is suitable (resource availability) for the HO for the UE (10) based on the measurement report.

At S108, the source gNB (20) initiates a handover request message to the target gNB (30) through an Xn interface. At S110, the target gNB (30) determines whether resource availability is enough for the UE (10).

At S112, the target gNB (30) response back with a handover request acknowledgement (ACK) message which provides the resources required by the UE (10) to latch with the target gNB (30). This time (S102-S112) is called a HO preparation time (i.e., 15 milliseconds), as shown in Table 1.

TABLE 1

| HO latency in LTE networks | |
| --- | --- |
| Message | Time (millisecond) |
| RRC HO command | 15 |
| UE processing time for RF/baseband tuning | 20 |
| Acquiring first available RACH in target cell | 2.5 |
| PRACH preamble transmission | 1 |
| UL allocation and TA transmission | 5 |
| Processing RRC message and TTI alignment | 3 |
| RRC message encapsulation and transmission | 3 |
| Minimum/Typical Total delay | 9.5 |

At S114, the source gNB (20) sends radio resource control (RRC) HO command to the UE (10) and the UE (10) initiates a contention-free random access channel (RACH) procedure using dedicated resources provided by the target gNB (30). At S116, the target gNB (30) provides a dedicated channel for the UE (10) to connect. This time (S114-S116) is called a HO execution time.

In comparison, most of the existing systems operate on RACH-less handover to reduce the HO execution time but not for the HO preparation time. The HO preparation time is a major factor to consider since there are many scenarios in the 5G NR like a fast-moving vehicle where the UE (10) after sending the measurement report is waiting for the HO command from the source gNB (20) but signal deteriorates to a level which causes radio link failure. So, there is a need to have a solution that reduces the HO preparation time.

Thus, it is desired to address the above-mentioned disadvantages or other shortcomings or at least provide a useful alternative.

The principal object of the embodiments herein is to provide a method for handover management in which a HO preparation is performed with a plurality of target gNBs by applying a machine learning (ML) model on a plurality of parameters to determine potential target gNBs for HO for a UE in a wireless network.

Another object of the embodiments is to determine whether a UE reported target gNBs is the same as predicted target gNBs for an advanced HO and triggering a HO command immediately in response to determining that the UE reported target gNBs is same as predicted target gNBs for an advanced HO.

Another object of the embodiments is to reduce a HOF rate by reducing the HO preparation time in the wireless network and offering a better quality of experience (QoE) to a user.

SUMMARY

Accordingly, the embodiments herein provide a method of a source base station for handover (HO) management in a wireless network. The method comprises determining at least one user equipment (UE) from a plurality of UEs suitable for a HO in the wireless network; determining at least one target base station from a plurality of target base stations suitable for the HO for the at least one UE in the wireless network; sending at least one HO request command to the at least one determined target base station to prepare the HO of the at least one UE from the source base station; determining whether a measurement report is received from the at least one UE within a predefined time, wherein the measurement report comprises a plurality of parameters associated with the at least one UE; sending at least one HO command to the at least one UE to perform the HO to at least one determined target base station based on the plurality of parameters associated with the at least one UE in response to determining that the measurement report is received from the at least one UE within the predefined time; and sending at least one HO cancel command to the at least one determined target base station in response to determining that the measurement report is not received from the at least one UE within the predefined time.

The embodiments herein also provide a source base station for handover (HO) management in a wireless network, The source base station comprises: a memory; a communication interface; and at least one processor coupled with the memory, and the communication interface, the at least one processor configured to: determine at least one user equipment (UE) from a plurality of UEs is suitable for a HO in the wireless network; determine at least one target base station from a plurality of target base stations suitable for the HO for the at least one UE in the wireless network; send at least one HO request command to the at least one determined target base station to prepare the HO of the at least one UE from the source base station; determine whether a measurement report is received from the at least one UE within a predefined time, wherein the measurement report comprises a plurality of parameters associated with the at least one UE; send at least one HO command to the at least one UE to perform the HO to at least one determined target base station based on the plurality of parameters associated with the at least one UE in response to determining that the measurement report is received from the at least one UE within the predefined time; and send at least one HO cancel command to the at least one determined target base station in response to determining that the measurement report is not received from the at least one UE within the predefined time.

The embodiments herein further provide a non-transitory computer readable storage medium storing instructions which, when executed by at least one processor of a source base station in a wireless network, causes the at least one processor to perform operations. The operations comprises determining at least one user equipment (UE) from a plurality of UEs suitable for a handover (HO) in the wireless network; determining at least one target base station from a plurality of target base stations suitable for the HO for the at least one UE in the wireless network; sending at least one HO request command to the at least one determined target base station to prepare the HO of the at least one UE from the source base station; determining whether a measurement report is received from the at least one UE within a predefined time, wherein the measurement report comprises a plurality of parameters associated with the at least one UE; sending at least one HO command to the at least one UE to perform the HO to at least one determined target base station based on the plurality of parameters associated with the at least one UE in response to determining that the measurement report is received from the at least one UE within the predefined time; and sending at least one HO cancel command to the at least one determined target base station in response to determining that the measurement report is not received from the at least one UE within the predefined time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
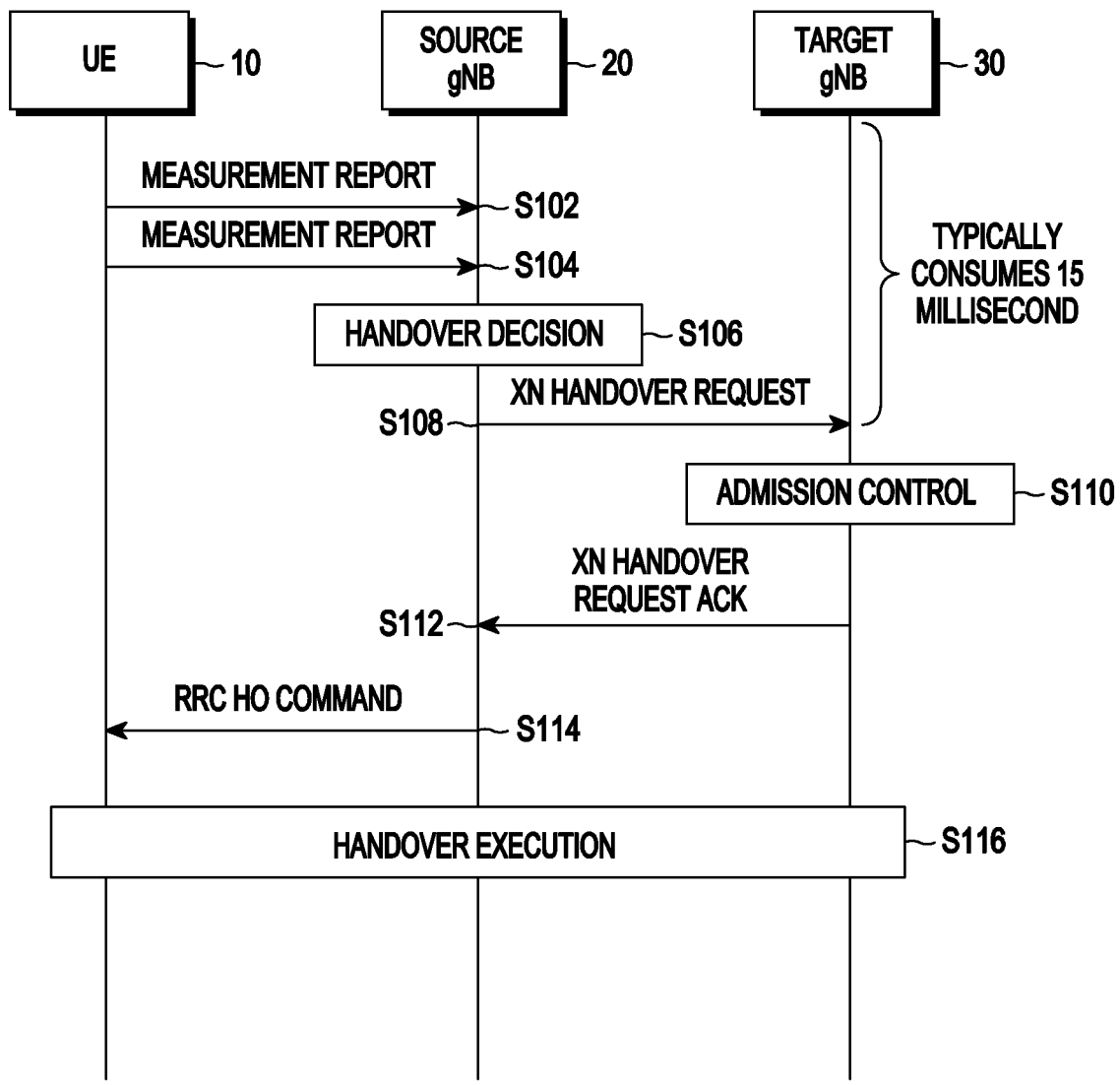
FIG. 1 is a sequence diagram illustrating various operations for performing HO procedure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout this disclosure, the terms "source base station" and "source gNB" are used interchangeably and mean the same. The terms "target base station" and "target gNB" are used interchangeably and mean the same.

Accordingly, the embodiments herein provide a method and base station for a HO management in a wireless network. The method includes determining, by a source base station, a user equipment (UE) from a plurality of UEs is suitable for HO in the wireless network. Further, the method includes predicting, by the source base station, a target base station from a plurality of target base stations suitable for the HO for the UE in the wireless network. Further, the method includes sending, by the source base station, a HO request command to the predicted target base station to prepare the HO of the UE from the source base station. Further, the method includes determining, by the source base station, whether a measurement report is received from the UE within a predefined time, wherein the measurement report comprises a plurality of parameters associated with the UE. Further, the method includes sending, by the source base station, a HO command to the UE to perform the HO to the prepared target base station based on the plurality of parameters associated with the UE in response to determining that the measurement report is received from the UE within the predefined time. Further, the method includes sending, by the source base station, a HO cancel command to the prepared target base station in response to determining that the measurement report is not received from the UE within the predefined time.

Referring now to the drawings and more particularly to FIGS. 2 through 6, where similar reference characters denote corresponding features consistently throughout the figures, there are shown preferred embodiments.

Figure 2:
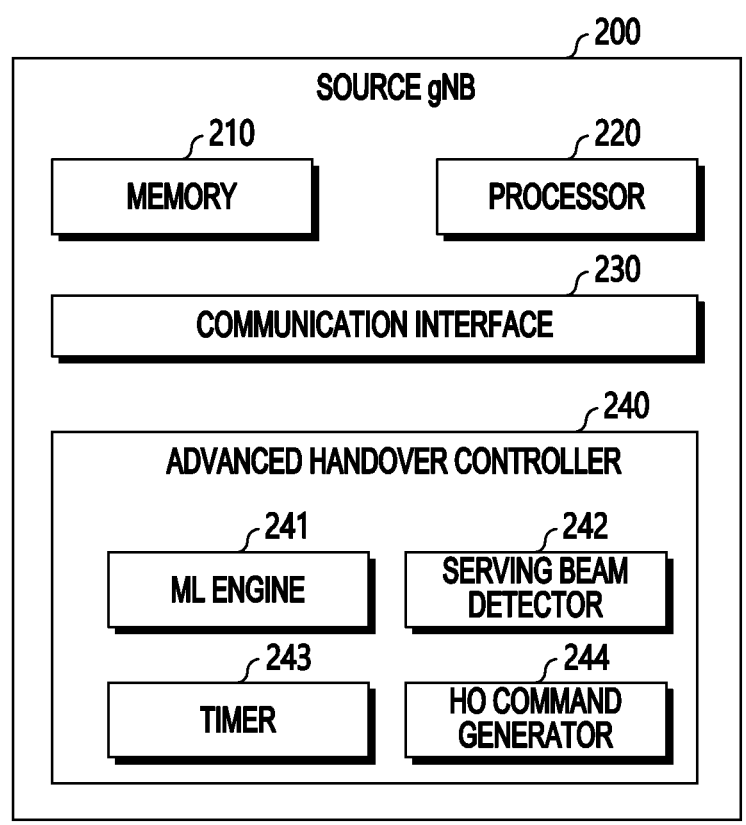
FIG. 2 illustrates a block diagram of a source gNB for a HO management in a wireless network according to an embodiment as disclosed herein.

FIG. 2 illustrates a block diagram of a source gNB (200) (i.e., source base station (200) or serving base station (200)) for the HO management in a wireless network (1000) according to an embodiment as disclosed herein. In an embodiment, the source gNB (200) includes a memory (210), a processor (220), a communication interface (230), and an advanced handover controller (240).

The source base station (200) can be, for example, but not limited to, an evolved node B (eNodeB), a gNodeB, a next generation base station/node, and an integrated access and backhaul (IAB) node, can work on a virtualized radio access network (V-RAN), a cloud/centralized radio access network (C-RAN), and an open radio access network (O-RAN), etc.

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). The memory (210) can be an internal storage unit or it can be an external storage unit of the source gNB (200), a cloud storage, or any other type of external storage.

The processor (220) communicates with the memory (210), the communication interface (230), and the advanced handover controller (240). The processor (220) is configured to execute instructions stored in the memory (210) and to perform various processes. The communication interface (230) is configured for communicating internally between internal hardware components and with external devices via one or more networks.

The advanced handover controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The advanced handover controller (240) and the processor (220) may be integrally referred to as at least one processor.

In an embodiment, the advanced handover controller (240) includes a machine learning (ML) engine (241), a serving beam detector (242), a timer (243), and a HO command generator (244).

The ML engine (241) periodically collects a plurality of parameters from a plurality of user equipment (UEs) (100) in the wireless network (1000). The collected plurality of parameters associated with the UE (100) comprises a timing advance (TA), a downlink block error rate (BLER) measurement, a layer-1 (L1) reference signal receive power (RSRP) measurement, and a beam switching pattern measured at the UE (100). There could be many network parameters which can contribute to a radio link failure of the UE (100), among which the above mentioned network parameters are observed to be highly correlated when the radio link failure occurs. For e.g., when the radio link failure occurs the BLER of the UE (100) is mostly high, due to poor reference signal received power with timing advance also being poor. Further, the ML engine (241) selects a UE (100) from the plurality of UEs for the HO in the wireless network (1000) based on predefined continuously learned thresholds (threshold range) of radio link failure (RLF). Further, the ML engine (241) determines whether a parameter from the plurality of parameters associated with the UE (100) reported in a measurement report is within a threshold (threshold range). Further, the ML engine (241) selects the least one UE (100) for the HO in the wireless network (1000) in response to determining that the value of the collected plurality of parameters is higher than the threshold range. Further, the ML engine (241) continuously monitors the value of the collected plurality of parameters in the wireless network (1000) in response to determining that the value of the collected plurality of parameters is lower than the threshold range.

The serving beam detector (242) determines a movement of the UE (100) in the wireless network (1000). Further, the serving beam detector (242) determines a serving beam identity (ID) of the UE (100), the serving beam ID is calculated based on a rate of change of cumulative TA and the beam switching pattern. Further, the serving beam detector (242) predicts a target base station (300) from the plurality of target base stations suitable for the HO for the UE (100) based on the determined serving beam ID. The detailed explanation and example scenario relate to serving beam ID are explained in the FIG. 5 and FIG. 6.

The HO command generator (244) determines whether the measurement report is received from the UE (100) within a predefined time, the predefined time is counted by the timer (243). The predefined time is an operator configured parameter. The predefined time can be decided by the operator based on the cell load of neighbors and frequency of handovers required. If neighbor cells have less load and number of handovers are less the predefined time can be leveraged, so that the UE (100) gets sufficient time to measure the neighbor cell and report to the source gNB (200). Further, the HO command generator (244) sends a HO request command to the predicted target base station (300) to prepare the HO of the UE (100) from the source base station (200), the HO is prepared by the predicted target base station (300) by reserving resources for the UE (100) (e.g., incoming UE (100)). Further, the HO command generator (244) sends a HO command to the UE (100) to perform the HO to the prepared target base station (300) based on the plurality of parameters associated with the UE (100) in response to determining that the measurement report is received from the UE (100) within the predefined time and the parameter from the plurality of parameters received from the UE (100) in the measurement report is within the threshold. The HO command generator (244) sends the HO command on an Xn interface the wireless network (1000). E.g., the HO command referring to RRC-Reconfiguration message sent to the UE (100) containing PCI of the target base station (300) and other required resources for the UE (100) to attach to the target base station (300).

Further, the HO command generator (244) sends a HO cancel command to the prepared target base station (300) in response to determining that the measurement report is not received from the UE (100) within the predefined time and the parameter from the plurality of parameters received from the UE in the measurement report is not within the threshold.

At least one of the plurality of modules/components may be implemented through an artificial intelligence (AI) model. A function associated with the AI model may be performed through memory (110) and the processor (120).

The processor (120) may include one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The processor (120) controls the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), a generative adversarial network (GAN), and a deep Q-network.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In supervised learning processes, a target/outcome variable (or dependent variable) which is to be predicted from a given set of predictors (independent variables). Using these sets of variables generates a function that map inputs to desired outputs (i.e., suitable UE (100) and the target base station (300) for the HO). The training process continues until the model achieves a desired level of accuracy on the training data. Examples of supervised learning: regression, decision tree, random forest, KNN, logistic regression, etc.

In unsupervised learning processes, do not have any target or outcome variable to predict/estimate. It is used for clustering population in different groups, which is widely used for segmenting in different groups for specific intervention. Examples of unsupervised learning: Apriori mechanism, K-means, etc.

In reinforcement learning processes, the machine (i.e., the ML engine (241)) is trained to make specific decisions (suitable UE (100) and the target base station (300) for the HO). The machine is exposed to an environment where the machine trains itself continually using trial and error. The machine learns from past experience and tries to capture the best possible knowledge to make accurate business decisions (for the advanced HO). Example of reinforcement learning: Markov decision process, etc.

Although the FIG. 2 shows various hardware components of the source gNB (200) but it is to be understood that other embodiments are not limited thereon. In other embodiments, the source gNB (200) may include less or more number of components. Further, the labels or names of the components are used only for illustrative purpose and does not limit the scope of the disclosure. One or more components can be combined together to perform same or substantially similar function for the HO management in the wireless network (1000).

Figure 3:
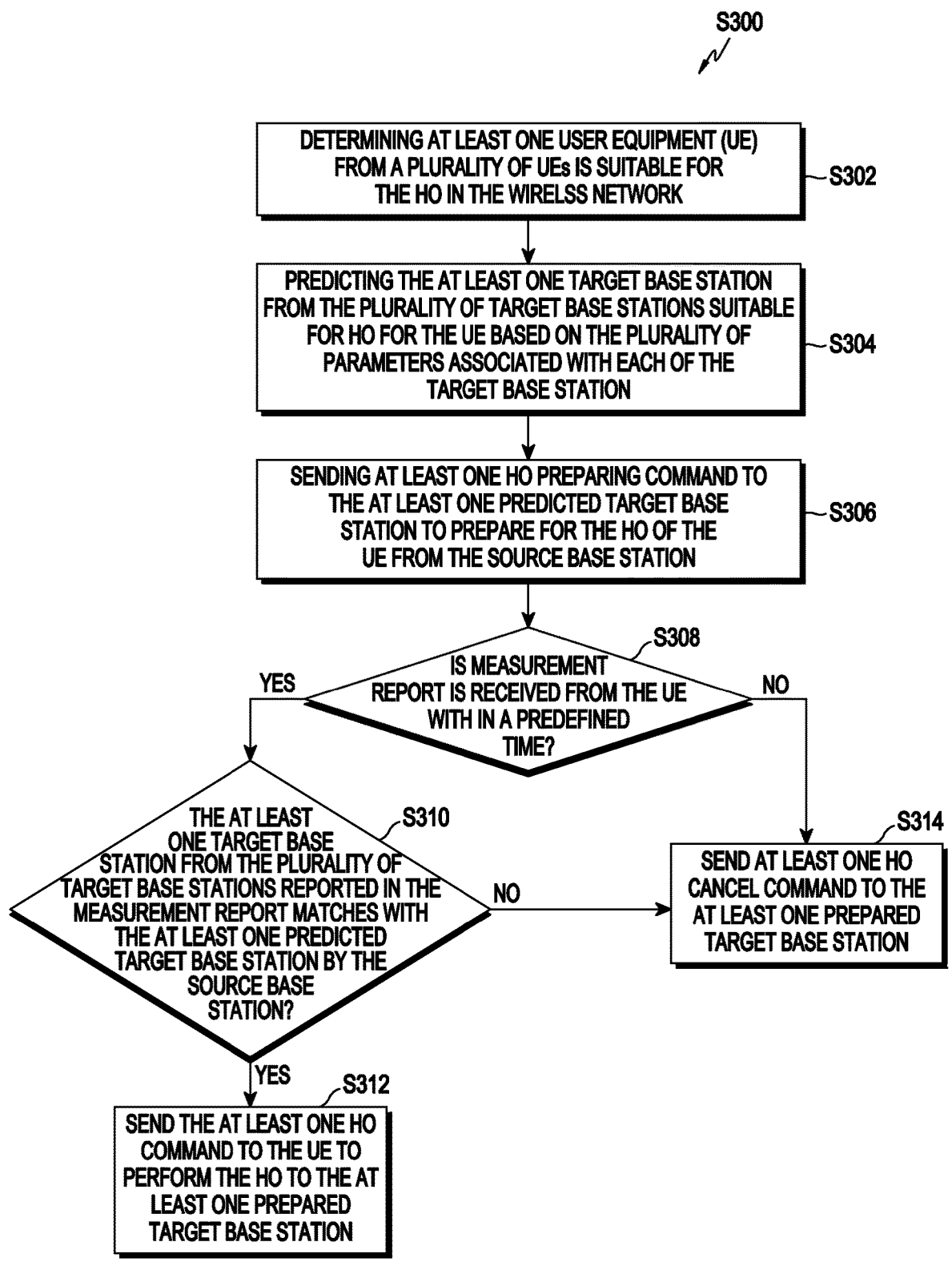
FIG. 3 is a flow diagram illustrating various operations for the HO management in the wireless network according to an embodiment as disclosed herein.

FIG. 3 is a flow diagram (S300) illustrating various operations for the HO management in the wireless network (1000) according to an embodiment as disclosed herein. The operations (S302-S314) are performed by the advanced handover controller (240).

At S302, the method includes determining the UE (100) from the plurality of UEs is suitable for the HO in the wireless network (1000). At S304, the method includes predicting the target base station (300) from the plurality of target base stations suitable for the HO for the UE (100) based on the plurality of parameters associated with each of the target base station (300). At S306, the method includes sending the HO request command to the predicted target base station (300) to prepare the HO of the UE (100) from the source base station (200).

At S308, the method includes determining whether the measurement report is received from the UE (100) within the predefined time, the measurement report comprises the plurality of parameters associated with the UE (100). At S310, the method includes determining whether the target base station (300) from the plurality of target base station reported in the measurement report matches with the predicted target base station by the source base station (200).

At S312, the method includes sending the HO command to the UE (100) to perform the HO to the prepared target base station (300) based on the plurality of parameters associated with the UE (100) in response to determining that the target base station (300) from the plurality of target base stations reported in the measurement report matches with the predicted target base station (300) by the source base station (200).

At S314, the method includes sending the HO cancel command to the prepared target base station (300) in response to determining that the target base station (300) from the plurality of target base stations reported in the measurement report does not match with the predicted target base station (300) by the source base station (200).

The various actions, acts, blocks, steps, or the like in the flow diagram (S300) may be performed in the order presented, in a different order or simultaneously. Further, in some embodiments, some of the actions, acts, blocks, steps, or the like may be omitted, added, modified, skipped, or the like without departing from the scope of the disclosure.

Figure 4A:
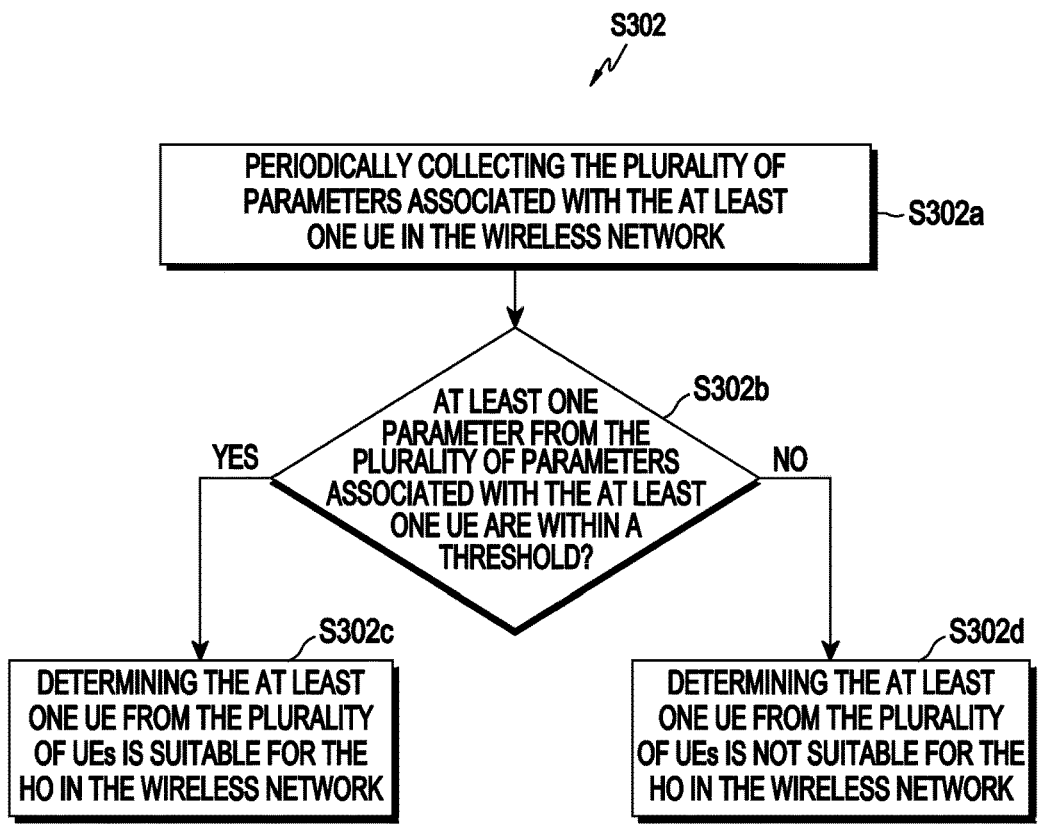
FIG. 4A is a flow diagram illustrating various operations for determining a UE from a plurality of UEs is suitable for a HO in the wireless network according to an embodiment as disclosed herein.

FIG. 4A is a flow diagram (S302) illustrating various operations for determining the UE (100) from the plurality of UEs is suitable for the HO in the wireless network (1000) according to an embodiment as disclosed herein. The operations (S302a-S302d) are performed by the advanced handover controller (240).

At S302a, the method includes periodically collecting the plurality of parameters associated with the UE (100) in the wireless network (1000). At S302b, the method includes determining whether the parameter from the plurality of parameters associated with the UE (100) are within the threshold. At S302c, the method includes determining the UE (100) from the plurality of UEs is suitable for the HO in the wireless network (1000) in response to determining that the parameter from the plurality of parameters associated with the UE (100) are within the threshold. At S302d, the method includes determining the UE (100) from the plurality of UEs is suitable for the HO in the wireless network (1000) in response to determining that the parameter from the plurality of parameters associated with the UE (100) are not within the threshold.

Figure 4B:
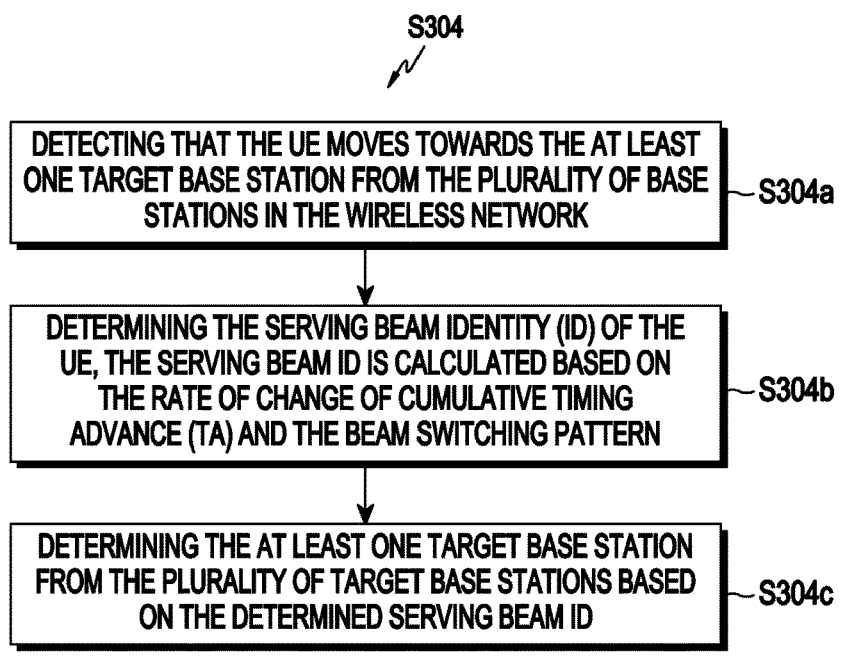
FIG. 4B is a flow diagram illustrating various operations for predicting target base station from a plurality of target base stations suitable for the HO for the UE in the wireless network according to an embodiment as disclosed herein.

FIG. 4B is a flow diagram (S304) illustrating various operations for predicting target base station (300) from the plurality of target base stations suitable for the HO for the UE (100) in the wireless network (1000), according to an embodiment as disclosed herein. The operations (S304a-S304c) are performed by the advanced handover controller (240).

At S304a, the method includes detecting that the UE (100) moves towards the target base station (300) from the plurality of base stations in the wireless network (1000). At S304b, the method includes determining the serving beam identity (ID) of the UE (100), the serving beam ID is calculated based on the rate of change of cumulative TA and the beam switching pattern. At S304c, the method includes determining the target base station (300) from the plurality of target base stations based on the determined serving beam ID.

Figure 5:
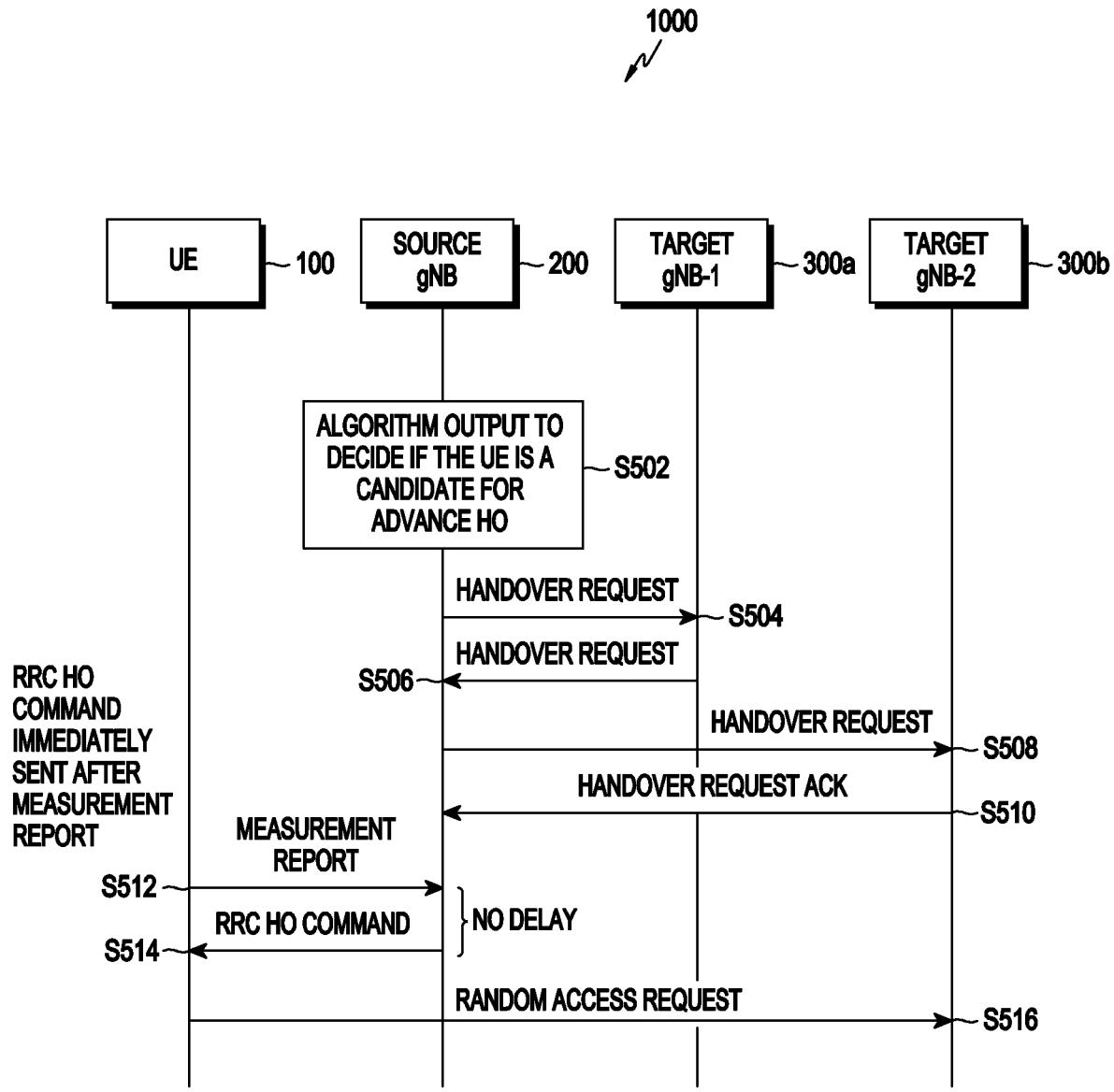
FIG. 5 is a sequence diagram illustrating various operations for the HO management in the wireless network according to an embodiment as disclosed herein.

FIG. 5 is a sequence diagram illustrating various operations for the HO management in the wireless network (1000), according to an embodiment as disclosed herein.

At S502, the ML engine (241) analyze pattern of the TA, the downlink BLER measurement, the L1 RSRP measurement, the beam switching pattern, and learn about a probability of RLF. Further, the ML engine (241) selects the UE (100) (i.e., candidate UE) from the plurality of UEs for the HO in the wireless network (1000) based on predefined continuously learned thresholds (threshold range) of RLF. For example, the UE (100) is a candidate UE for the HO if: (i) downlink BLER of the UE (100) has degraded beyond set ML-based downlink BLER threshold; (ii) L1-RSRP of the UE (100) has degraded beyond set ML-based L1-RSRP threshold; and/or (iii) TA-cumulative-increase of the UE (100) is above set ML-based threshold TA.

For example, the ML engine (241) uses a K-nearest neighbor (KNN) for the candidate UE (100) selection. The KNN is a classification method which uses supervised learning, which works on labeled input vector and then learns and predicts the class for a new unlabeled input vector. In this way the KNN predicts label for new data. The class prediction is based on the similarity between the data points metric which can be done using the Euclidian distance given by, $$d(x,y)=\sqrt{(x_1-y_1)^2+ \ldots +(x_n-y_n)^2} \quad (1)$$

where "x" and "y" are two data vectors. Given a number of classes or labels the KNN classification mechanism runs over the data set calculating the distance "d" between x and each of the training vectors. The conditional probability is then estimated for each classification label which is the likelihood of x belonging to class "$C_i$."

$$P=(C_i|X_i)=((\Pi P(X_i|C_i))*P(C_i))/P(X_i) \quad (2)$$

The class predicts if a UE is a candidate UE for radio link failure or causing handover failure based on the input vectors(x) containing of parameter i.e., downlink BLER, TA, L1-RSRP and beam switching pattern. The class conditional probability of picking a candidate UE for handover based on the parameters of downlink BLER and RSRP.

At S504-S510, the serving beam detector (242) determines the movement of the UE (100) in the wireless network (1000). Further, the serving beam detector (242) determines the serving beam identity (ID) of the UE (100), the serving beam ID is calculated based on a rate of change of cumulative TA and the beam switching pattern.

$$\text{Beam\_Id} = \text{Beam\_Id\_start} + \quad (3)$$
$$\text{Beam\_swith\_count}*((TA_{TH} - TA_{start})/TA_{CumulativeIncrease})$$

$$\text{Beam\_swith\_count} = \text{Beam\_Id\_end} - \text{Beam\_Id\_start} \quad (4)$$

$$TA_{CumulativeIncrease} = \sum_{i=0}^{TA\_monitoring\_period} TA_{delta} \quad (5)$$

where, Beam_Id_start=channel state information reference signal (CSI-RS) Beam Id of UE when a monitoring period started (TA_monitoring_period); Beam_Id_end=CSI-RS) Beam Id of UE when the monitoring period ended (TA_monitoring_period); Beam_switch_count=cumulative number of beam switch of CSI-RS beam in a monitoring duration (TA_monitoring_period); $TA_{TH}$=Configured threshold TA value considering where the HO may happen; $TA_{start}$=TA of UE when the monitoring period started (TA_monitoring_period); $TA_{CumulativeIncrease}$=cumulative increase in TA in monitoring duration (TA_monitoring_period); TA_monitoring_period=a time duration in which increase of UE TA and beam switch is counted; Also, the timing advance threshold value may be decided based on the geographical area since the rate of TA change varies in hilly and plain areas; and $TA_{delta}$=increase or decrease of TA in granular measurement period.

Further, the serving beam detector (242) predicts the target base station (300a or 300b) from the plurality of target base stations (300a and 300b) suitable for the HO for the UE (100) based on the determined serving beam ID. The source gNB (200) may have a database table which maintains each cell's beam_Id and the neighbor node (i.e., target gNB (300)) physical cell identity's (PCI's) falling the particular beam_Id's receding direction. Further, this table may be updated if there is any change in the beams or neighbor gNB's.

For example, the source gNB (200) have the table which maintain each cell's beam_Id and the neighbor node_Id and PCI's falling the particular beam_Id's receding direction as shown in the Table 2.

TABLE 2

Serving beam_Id and neighbor PCI relation

| Beam_Id | Neighbor node_Id | PCI |
|---------|------------------|-----|
| 1 | 1001 | 331 |
| 2 | 1003 | 341 |
| 3 | 1008 | 320 |
| 4 | 1025 | 41 |
| 5 | 1038 | 502 |
| 6 | 1120 | 640 |

Using the Table. 2, the target gNB (300) on which the HO preparation may be done may be known to the source gNB (200). If the beam_Id remains constant as beam_Id_1 and the beam signal measurement at layer 1 shows deterioration along with TA degradation then the as per Table. 2 the HO command generator (244) sends the HO request command for the advanced HO to gNB Id 1001, PCI 331.

Further, the HO command generator (244) sends the HO request command to the at least one predicted target base station (300) to prepare the HO of the UE (100) from the source base station (200) and completes a HO preparation phase (i.e., HO preparation time) before receiving the measurement report from the UE (100).

At S512, the source gNB (200) receives the measurement report with preferred target gNB (300) from the UE (100). In an embodiment, the advanced handover preparation is valid only for $T_{AdvHoTimer}$ value (i.e., predefined time), and if the UE (100) does not send any measurement report on the source gNB (200) within $T_{AdvHoTimer}$, then HO cancel (i.e., the HO cancel command) is sent to the prepared target base stations.

At S514, the source gNB (200) sends the RRC HO command to the UE (100) immediately when the preferred target gNB (300) of the UE (100) is same as the predicted target base station (300) of the HO preparation phase. Thus, the HO preparation time is effectively zero in comparison to the existing HO procedure (FIG. 1). The HOF rate is reduced as the HO preparation time is effectively zero. At S514, the UE (100) sends a random access request to the target gNB (300) and latch with the target gNB (300).

Figure 6:
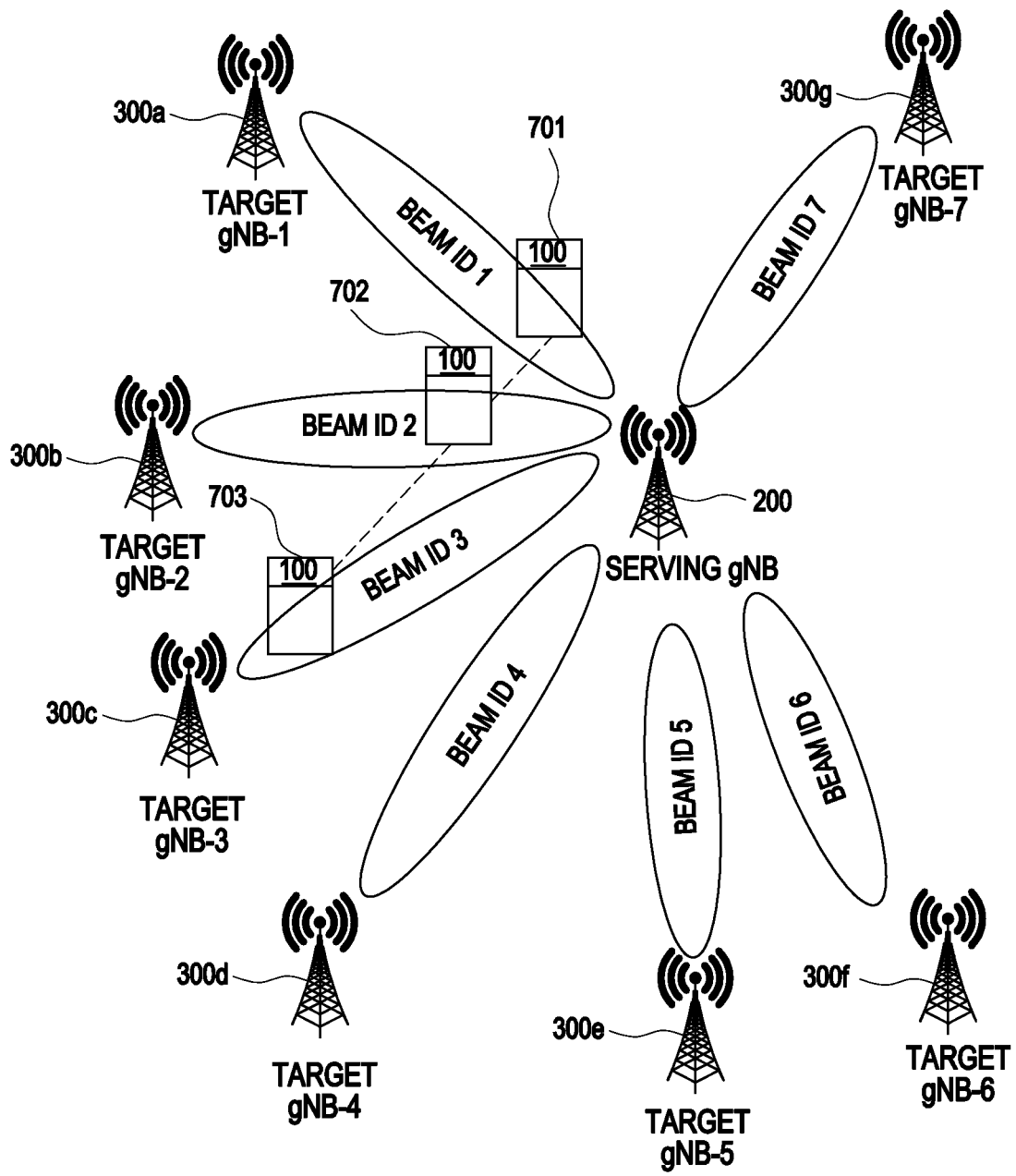
FIG. 6 is an example scenario illustrating a target gNB prediction from the plurality of the target gNBs suitable for the HO for the UE in the wireless network according to an embodiment as disclosed herein.

FIG. 6 is an example scenario illustrating the target gNB (300) prediction from the plurality of the target gNBs (300a-300g) suitable for the HO for the UE (100) in the wireless network (1000) according to an embodiment as disclosed herein.

For increased coverage the 5G NR uses beams based transmission which can be done using the synchronization signal blocks (SSB's) or the channel state information reference signal (CSI-RS). In the NR each cell broadcasts several beams (e.g., beam id-1, beam id-2, beam id-3, beam id-4, beam id-5, etc.) to cover an entire cell range.

Each connected UE (100) has a serving beam which is the strongest signal beam decoded at the UE (100) side. For example, at 701, the strongest signal beam is the beam id-1.

The UE (100) is configured to report (i.e., measurement report) a serving beam and a neighbor beam quality continuously to the source gNB (200). For example, at 701, the serving beam is the beam id-1, and the neighbor beam is the beam id-2 and the beam id-7. Furthermore, RRC configures beam RSRP threshold based on which the UE (100) needs to report all the beams decoded by the UE (100) which meets the configured thresholds. Since each beam is transmitted by the source gNB (200) in a particular direction based on a phase and azimuth of the antenna array of the source gNB (200). Therefore, the source gNB (200) can be well aware of the UE (100)'s movement, the UE's best beam, and the UE's direction. For example, the UE (100) moves at the particular direction (from 701 to 702), at 701, the serving beam is the beam id-1 and the neighbor beam is the beam id-2 and the beam id-7 while at 702, the serving beam is the beam id-2 and the neighbor beam is the beam id-1 and the beam id-3.

Furthermore, the reporting of serving beam RSRP is done at a physical layer and not at the RRC layer, the periodicity of reporting at L1 is kept high compared to the RRC layer, so the periodicity of beam measurement reporting is very high. Hence, this helps to decide the UE (100) direction of movement towards a particular neighbor cell as the UE (100) reports all the beams the UE (100) could see above-configured threshold by the source gNB (200).

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a source base station for handover (HO) management in a wireless network, the method comprising:
   determining at least one user equipment (UE) from a plurality of UEs suitable for a HO in the wireless network;
   determining at least one target base station from a plurality of target base stations suitable for the HO for the at least one UE in the wireless network;
   sending at least one HO request command to the at least one determined target base station to prepare the HO of the at least one UE from the source base station;
   determining whether a measurement report is received from the at least one UE within a predefined time, wherein the measurement report comprises a plurality of parameters associated with the at least one UE;
   determining whether one or more base station from a plurality of base stations reported in the measurement report matches with the at least one determined target base station, in response to determining that the measurement report is received from the at least one UE within the predefined time;
   sending at least one HO command to the at least one UE to perform the HO to at least one determined target base station based on the plurality of parameters associated with the at least one UE in response to determining that the one or more base station from the plurality of base stations reported in the measurement report matches with the at least one determined target base station; and
   sending at least one HO cancel command to the at least one determined target base station in response to determining that the measurement report is not received from the at least one UE within the predefined time or determining that the one or more base station from the plurality of base stations reported in the measurement report does not match with the at least one determined target base station.

2. The method of claim 1, wherein the plurality of parameters associated with the at least one UE comprises at least one of a timing advance, a downlink block error rate (BLER) measurement, a layer-1 (L1) reference signal receive power (RSRP) measurement, and a beam switching pattern measured at the at least one UE.

3. The method of claim 1, wherein determining the at least one UE from the plurality of UEs suitable for the HO in the wireless network comprises:
   periodically collecting the plurality of parameters associated with the at least one UE in the wireless network;
   determining whether at least one parameter from the plurality of parameters associated with the at least one UE is within a threshold;
   determining that the at least one UE from the plurality of UEs is suitable for the HO in the wireless network in response to determining that the at least one parameter from the plurality of parameters associated with the at least one UE is within the threshold; and
   determining that the at least one UE from the plurality of UEs is not suitable for the HO in the wireless network in response to determining that the at least one parameter from the plurality of parameters associated with the at least one UE is not within the threshold.

4. The method of claim 3, wherein the threshold is dynamically updated by a machine learning (ML) model based on at least one of learning of radio link failure and geographical location of the source base station in the wireless network.

5. The method of claim 1, wherein determining the at least one target base station from the plurality of target base stations suitable for the HO for the UE in the wireless network comprises:
   detecting that the at least one UE moves towards the at least one target base station from the plurality of target base stations in the wireless network;
   determining a serving beam identity (ID) of the at least one UE, wherein the serving beam ID is calculated based on a rate of change of cumulative timing advance (TA) and a beam switching pattern; and
   determining the at least one target base station from the plurality of target base stations based on the determined serving beam ID.

6. The method of claim 1, wherein the predefined time is configured by the source base station based on a rate of handovers and a current load of the source base station.

7. A source base station for handover (HO) management in a wireless network, the source base station comprising:
   a memory;
   a communication interface; and
   at least one processor coupled with the memory, and the communication interface, wherein the at least one processor is configured to:
      determine at least one user equipment (UE) from a plurality of UEs is suitable for a HO in the wireless network;
      determine at least one target base station from a plurality of target base stations suitable for the HO for the at least one UE in the wireless network;
      send at least one HO request command to the at least one determined target base station to prepare the HO of the at least one UE from the source base station;
      determine whether a measurement report is received from the at least one UE within a predefined time, wherein the measurement report comprises a plurality of parameters associated with the at least one UE;

determine whether one or more base station from a plurality of base stations reported in the measurement report matches with the at least one determined target base station, in response to determining that the measurement report is received from the at least one UE within the predefined time;
send at least one HO command to the at least one UE to perform the HO to at least one determined target base station based on the plurality of parameters associated with the at least one UE in response to determining that the one or more base station from the plurality of base stations reported in the measurement report matches with the at least one determined target base station; and
send at least one HO cancel command to the at least one determined target base station in response to determining that the measurement report is not received from the at least one UE within the predefined time or determining that the one or more base station from the plurality of base stations reported in the measurement report does not match with the at least one determined target base station.

8. The source base station of claim 7, wherein the plurality of parameters associated with the at least one UE (100) comprises at least one of a timing advance, a downlink block error rate (BLER) measurement, a layer-1 (L1) reference signal receive power (RSRP) measurement, and a beam switching pattern measured at the at least one UE.

9. The source base station of claim 7, wherein the at least one processor is further configured to:
periodically collect the plurality of parameters associated with the at least one UE in the wireless network;
determine whether at least one parameter from the plurality of parameters associated with the at least one UE is within a threshold;
determine that the at least one UE from the plurality of UEs is suitable for the HO in the wireless network in response to determining that the at least one parameter from the plurality of parameters associated with the at least one UE is within the threshold; and
determine that the at least one UE from the plurality of UEs is not suitable for the HO in the wireless network in response to determining that the at least one parameter from the plurality of parameters associated with the at least one UE is not within the threshold.

10. The source base station of claim 9, wherein the threshold is dynamically updated by a machine learning (ML) model based on at least one of learning of radio link failure and geographical location of the source base station in the wireless network.

11. The source base station of claim 7, wherein at least one processor is further configured to:
detect that the at least one UE moves towards the at least one target base station from the plurality of target base stations in the wireless network;
determine a serving beam identity (ID) of the at least one UE, wherein the serving beam ID is calculated based on a rate of change of cumulative timing advance (TA) and a beam switching pattern; and
determine the at least one target base station from the plurality of target base stations based on the determined serving beam ID.

12. The source base station of claim 7, wherein the predefined time is configured by the source base station based on a rate of handovers and a current load of the source base station.

13. A non-transitory computer readable storage medium storing instructions which, when executed by at least one processor of a source base station in a wireless network, causes the at least one processor to perform operations, the operations comprising:
determining at least one user equipment (UE) from a plurality of UEs suitable for a handover (HO) in the wireless network;
determining at least one target base station from a plurality of target base stations suitable for the HO for the at least one UE in the wireless network;
sending at least one HO request command to the at least one determined target base station to prepare the HO of the at least one UE from the source base station;
determining whether a measurement report is received from the at least one UE within a predefined time, wherein the measurement report comprises a plurality of parameters associated with the at least one UE;
determining whether one or more base station from a plurality of base stations reported in the measurement report matches with the at least one determined target base station, in response to determining that the measurement report is received from the at least one UE within the predefined time;
sending at least one HO command to the at least one UE to perform the HO to at least one determined target base station based on the plurality of parameters associated with the at least one UE in response to determining that the one or more base station from the plurality of base stations reported in the measurement report matches with the at least one determined target base station; and
sending at least one HO cancel command to the at least one determined target base station in response to determining that the measurement report is not received from the at least one UE within the predefined time or determining that the one or more base station from the plurality of base stations reported in the measurement report does not match with the at least one determined target base station.

14. The non-transitory computer readable storage medium of claim 13, wherein the plurality of parameters associated with the at least one UE comprises at least one of a timing advance, a downlink block error rate (BLER) measurement, a layer-1 (L1) reference signal receive power (RSRP) measurement, and a beam switching pattern measured at the at least one UE.

15. The non-transitory computer readable storage medium of claim 13, wherein determining the at least one UE from the plurality of UEs suitable for the HO in the wireless network comprises:
periodically collecting the plurality of parameters associated with the at least one UE in the wireless network;
determining whether at least one parameter from the plurality of parameters associated with the at least one UE is within a threshold;
determining that the at least one UE from the plurality of UEs is suitable for the HO in the wireless network in response to determining that the at least one parameter from the plurality of parameters associated with the at least one UE is within the threshold; and
determining that the at least one UE from the plurality of UEs is not suitable for the HO in the wireless network in response to determining that the at least one parameter from the plurality of parameters associated with the at least one UE is not within the threshold.

16. The non-transitory computer readable storage medium of claim 13, determining the at least one target base station from the plurality of target base stations suitable for the HO for the UE in the wireless network comprises:
- detecting that the at least one UE moves towards the at least one target base station from the plurality of target base stations in the wireless network;
- determining a serving beam identity (ID) of the at least one UE, wherein the serving beam ID is calculated based on a rate of change of cumulative timing advance (TA) and a beam switching pattern; and
- determining the at least one target base station from the plurality of target base stations based on the determined serving beam ID.

17. The non-transitory computer readable storage medium of claim 13, wherein the predefined time is configured by the source base station based on a rate of handovers and a current load of the source base station.

* * * * *